US009445081B1

(12) United States Patent
Kouperman et al.

(10) Patent No.: US 9,445,081 B1
(45) Date of Patent: Sep. 13, 2016

(54) METHOD AND SYSTEM OF 3D IMAGE CAPTURE WITH DYNAMIC CAMERAS

(71) Applicant: INTEL CORPORATION, Santa Clara, CA (US)

(72) Inventors: Vladimir Kouperman, Haifa (IL); Gila Kamhi, Zichron Yaakov (IL); Nadav Zamir, Raanana (IL); Barak Hurwitz, Kibbutz Alonim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,523

(22) Filed: Sep. 25, 2015

(51) Int. Cl.
| H04N 5/247 | (2006.01) |
| H04N 13/02 | (2006.01) |
| G06T 15/00 | (2011.01) |
| G06T 7/00 | (2006.01) |

(52) U.S. Cl.
CPC ........... H04N 13/0271 (2013.01); G06T 7/004 (2013.01); G06T 7/0065 (2013.01); G06T 15/00 (2013.01); H04N 5/247 (2013.01)

(58) Field of Classification Search
CPC .. H04N 13/0271; G06T 7/004; G06T 7/0065
See application file for complete search history.

(56) References Cited

U.S. PATENT DOCUMENTS

| 2010/0231605 | A1* | 9/2010 | Moriya | G06F 19/321 345/619 |
| 2013/0070961 | A1* | 3/2013 | Kia | G06T 7/0028 382/103 |
| 2013/0286012 | A1* | 10/2013 | Medioni | G06T 17/00 345/420 |
| 2016/0029009 | A1* | 1/2016 | Lu | G01B 11/2545 348/47 |
| 2016/0086343 | A1* | 3/2016 | Namiki | B25J 9/1697 348/135 |
| 2016/0110879 | A1* | 4/2016 | Garnavi | G06T 7/20 382/131 |
| 2016/0119541 | A1* | 4/2016 | Alvarado-Moya | H04N 5/23238 348/38 |

OTHER PUBLICATIONS

Besl et al., "A Method for Registration of 3-D Shapes", IEEE Transactions on Pattern Analysis and Machine Intelligence, vol. 14, No. 2, Feb. 1992, 18 pages.
Chui et al., "A New Point Matching Algorithm for Non-Rigid Registration", Computer Vision and Image Understanding, Feb. 2003, pp. 114-141.

* cited by examiner

*Primary Examiner* — W B Perkey
(74) *Attorney, Agent, or Firm* — Green, Howard & Mughal LLP

(57) ABSTRACT

Techniques related to 3D image capture with dynamic cameras.

25 Claims, 11 Drawing Sheets

500

OBTAIN IMAGE DATA INCLUDING DEPTH DATA OF SEQUENCES OF FRAMES OF AT LEAST ONE SCENE, WHEREIN INDIVIDUAL SEQUENCES ARE CAPTURED FROM INDIVIDUAL CAMERAS OF A PLURALITY OF CAMERAS
502

DETERMINE THE LOCATION OF THE IMAGE DATA OF THE SEQUENCES OF FRAMES ON A SHARED THREE-DIMENSIONAL COORDINATE SYSTEM OF THE PLURALITY OF THE CAMERAS BY USING THE IMAGE DATA OF MULTIPLE FRAMES TO DETERMINE THE LOCATION OF THE IMAGE DATA ON THE COORDINATE SYSTEM
504

WHEREIN THE LOCATION OF THE IMAGE DATA ON THE SHARED COORDINATE SYSTEM IS DETERMINED WITHOUT DETERMINING VALUES OF THE POSITIONS OF THE CAMERAS BEFORE THE CAPTURE OF THE SEQUENCES OF FRAMES IN ORDER TO USE THE VALUES OF THE POSITIONS IN COMPUTATIONS TO DETERMINE THE LOCATION OF THE IMAGE DATA ON THE SHARED COORDINATE SYSTEM
506

```
┌─────────────────────────────────────────────────────────┐
│ OBTAIN IMAGE DATA INCLUDING DEPTH DATA OF SEQUENCES OF  │
│ FRAMES OF AT LEAST ONE SCENE, WHEREIN INDIVIDUAL        │
│ SEQUENCES ARE CAPTURED FROM INDIVIDUAL CAMERAS OF A     │
│ PLURALITY OF CAMERAS                                    │
│ 502                                                     │
└─────────────────────────────────────────────────────────┘
                            ↓
┌─────────────────────────────────────────────────────────┐
│ DETERMINE THE LOCATION OF THE IMAGE DATA OF THE         │
│ SEQUENCES OF FRAMES ON A SHARED THREE-DIMENSIONAL       │
│ COORDINATE SYSTEM OF THE PLURALITY OF THE CAMERAS BY    │
│ USING THE IMAGE DATA OF MULTIPLE FRAMES TO DETERMINE THE│
│ LOCATION OF THE IMAGE DATA ON THE COORDINATE SYSTEM     │
│ 504                                                     │
└─────────────────────────────────────────────────────────┘
                            ↓
┌─────────────────────────────────────────────────────────┐
│ WHEREIN THE LOCATION OF THE IMAGE DATA ON THE SHARED    │
│ COORDINATE SYSTEM IS DETERMINED WITHOUT DETERMINING     │
│ VALUES OF THE POSITIONS OF THE CAMERAS BEFORE THE       │
│ CAPTURE OF THE SEQUENCES OF FRAMES IN ORDER TO USE THE  │
│ VALUES OF THE POSITIONS IN COMPUTATIONS TO DETERMINE THE│
│ LOCATION OF THE IMAGE DATA ON THE SHARED COORDINATE     │
│ SYSTEM                                                  │
│ 506                                                     │
└─────────────────────────────────────────────────────────┘
```

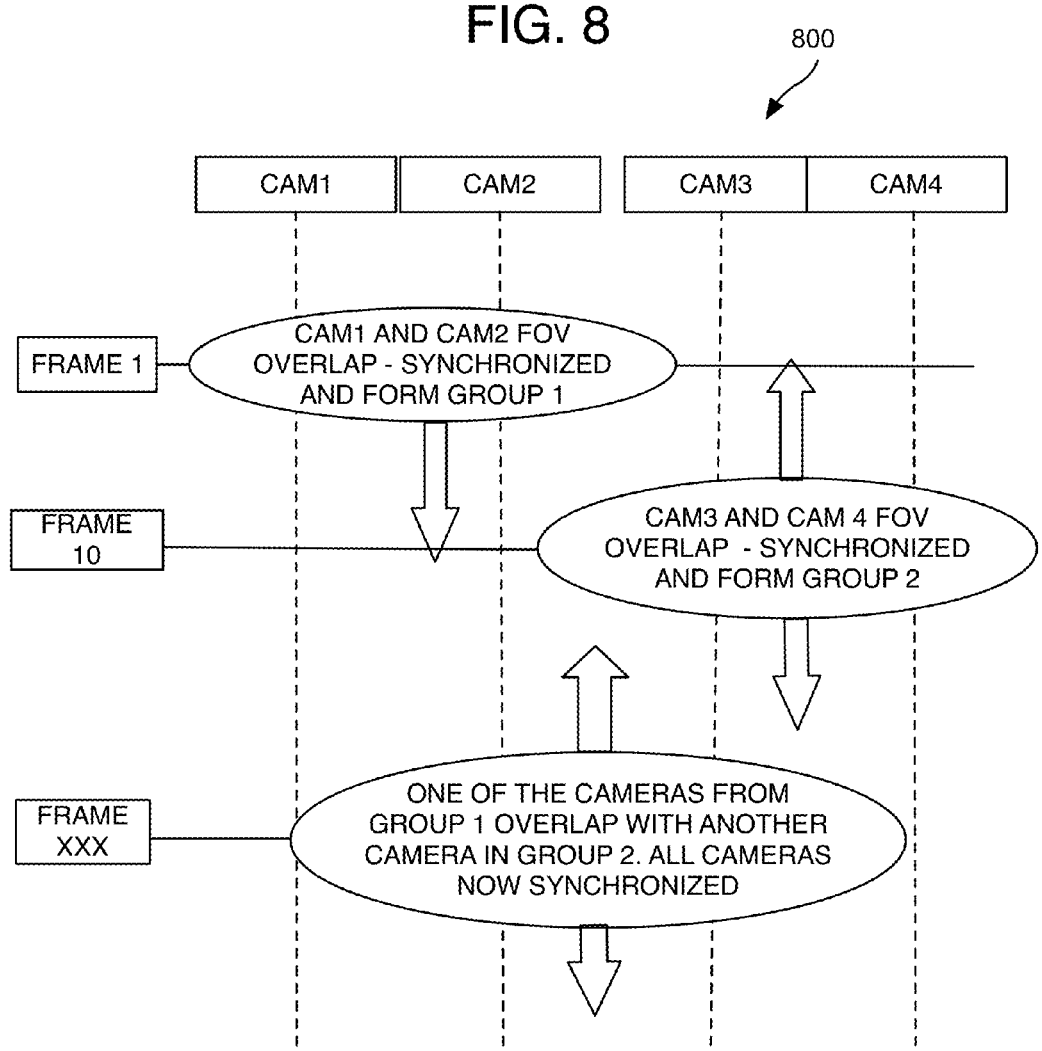

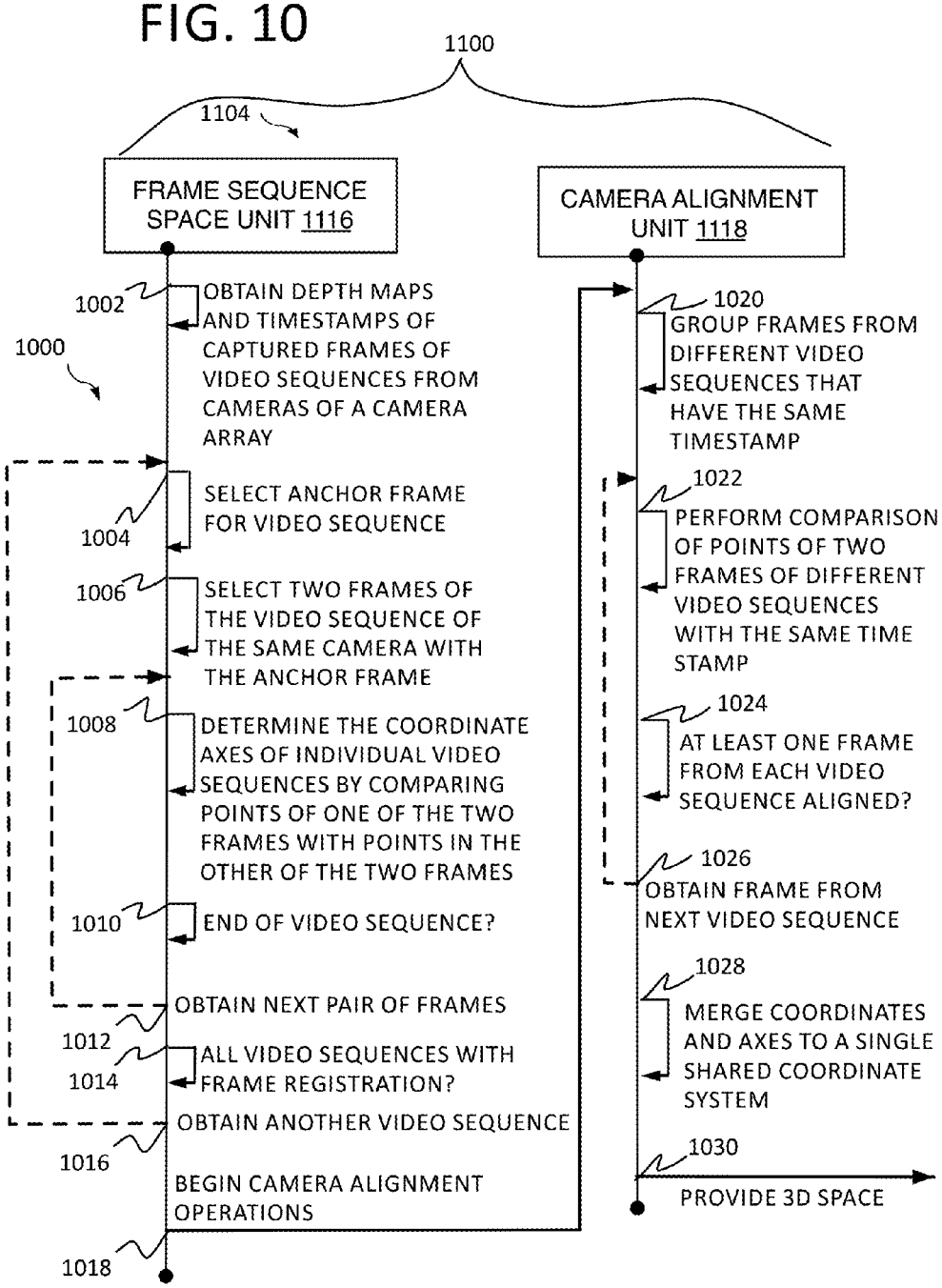

METHOD AND SYSTEM OF 3D IMAGE CAPTURE WITH DYNAMIC CAMERAS

BACKGROUND

A number of different applications use first person or point of view (POV) image capturing to enable a user or a viewer to modify the perspective of an object being viewed. Examples of these applications may include first person video such as the video capturing of a sports or entertainment event where it is possible to rotate or change the camera view and interpolate or otherwise generate a video from a new viewpoint that was not originally provided to capture video. When the objects being recorded are static, a moving camera may be used and moved around the object to capture images from multiple perspectives. When the objects to be recorded are moving, however, either multiple cameras must be mounted to the object which is not always possible, or an array of cameras surrounds the entire area where the objects may move thereby limiting the motion of the object which is often undesirable. The array of cameras is typically a static array of cameras that is costly and labor intensive to setup and synchronize.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is a flow chart for 3D image capture for dynamic cameras;

FIG. 8 is a schematic diagram to show a process for synchronizing dynamic cameras for 3D image capture;

FIG. 10 is a diagram showing a 3D image capture system with dynamic cameras in operation;

DETAILED DESCRIPTION

Figure 1:
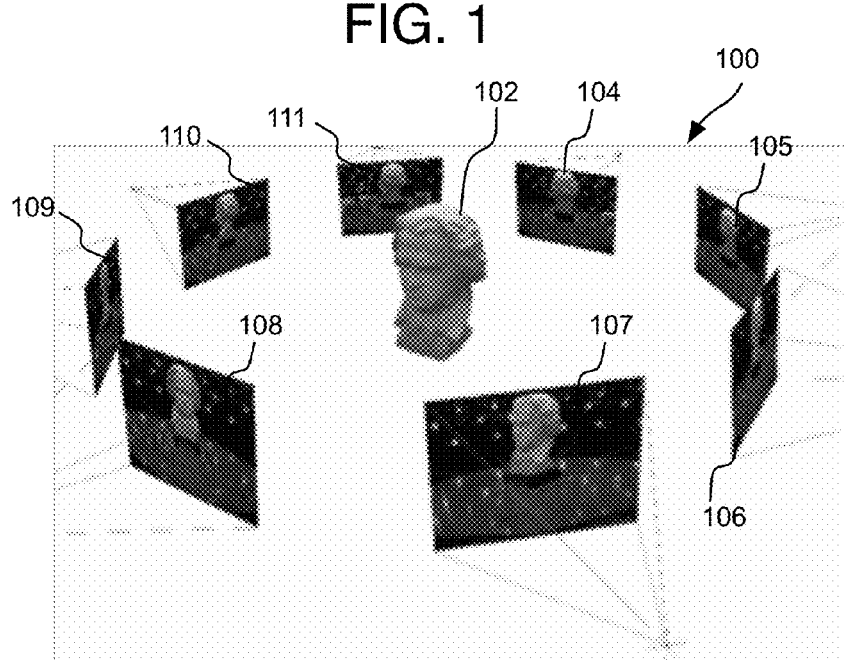
FIG. 1 is a three-dimensional view of an object and images from multiple perspectives around the object.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets with single or multiple cameras, and other moving devices with cameras such as any land, water, space, or air vehicle (such as one or more drones), and so forth, and any combination of these, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide 3D image capture with dynamic cameras.

3D video capturing (also referred to herein as recording, filming, or shooting) is often performed to provide a user different views or perspectives of the object being recorded. Usually, a 3D video capture is considered more compelling to view than a 2D video capture of the same scenario. Although there are several advantages, one of the most prominent advantages of 3D video capture versus 2D video capture may be the ability to interactively synthesize any intermediate view at any time using video view interpolation. Specifically, with conventional static multi-camera systems, the scene to be 3D captured is surrounded by a number of time synchronized cameras that are pre-positioned to a static position and with overlapping fields of view. Referring to FIG. 1, one example scene 100 with an object 102 may be captured by an array of cameras that form images 104 to 111. This enables capture and reconstruction of a live sequence of a static scene or a dynamic scene which then can be re-played as a video viewed from a virtual camera located somewhere in the scene by video view interpolation. This technique enables the viewer to move "in the scene" via the virtual camera, and view it from different angles while watching the scene. Examples include point of view (POV) video games, or viewing of athletic or entertainment events with the ability to continuously change the perspective of the image of the event.

Figure 2:
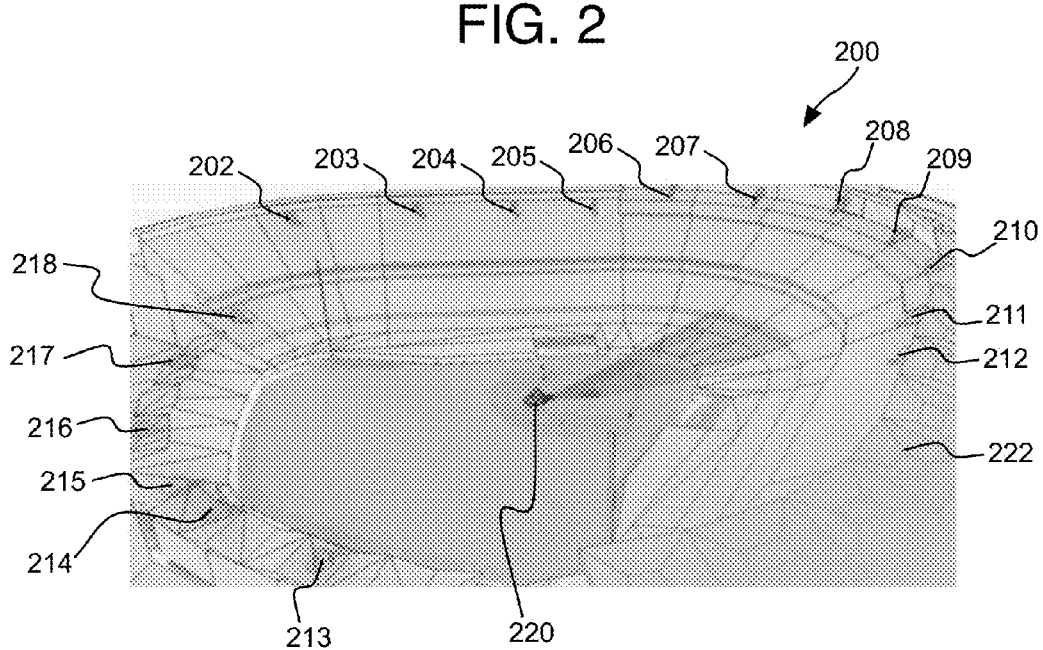
FIG. 2 is a three-dimensional view of a stadium with multiple cameras positioned for 3D image capture of dynamic objects in the stadium from multiple perspectives.
Figure 3:
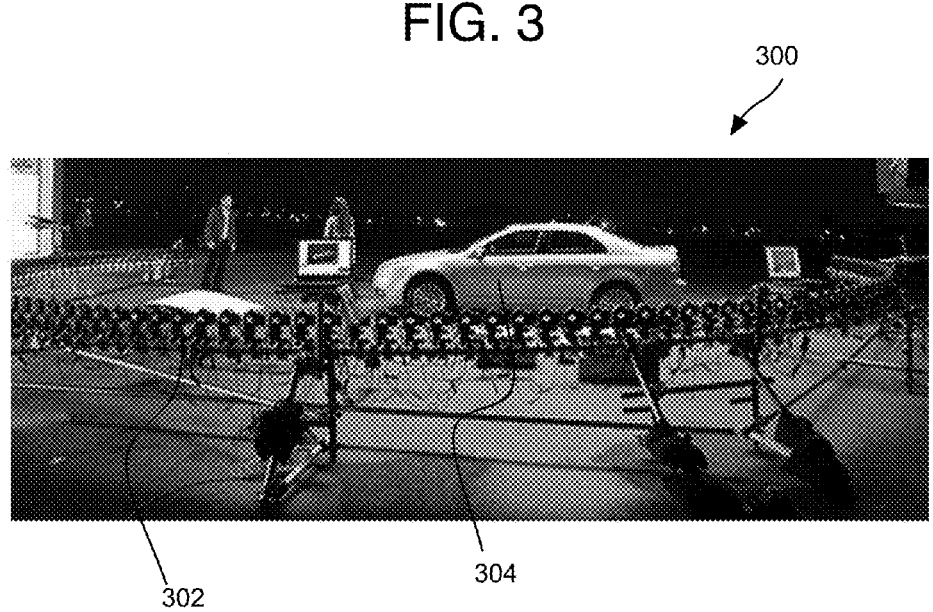
FIG. 3 is a photograph of a static circular camera array around a stationary object for 3D image recording.

Referring to FIG. 2 as one other specific example, conventional systems 200 may have static cameras 202 to 218 located at an athletic event such as at a baseball stadium 222 in order to capture 3D video of a baseball game. The cameras 202 to 218 are static cameras located at the stadium prior to the game and do not move during the 3D capture (not to be confused with moving television cameras that are typically permitted to rotate and tilt). A virtual camera 220 may be formed by using video view point interpolation from the images capture from the static cameras. Referring to FIG. 3, another example known system 300 may have a static camera array 302 that is position around a static object (the car) 304 to capture 360 degrees of perspectives of the object. It should be noted that these systems use many static cameras to attempt to capture many perspectives of the object.

Figure 4:
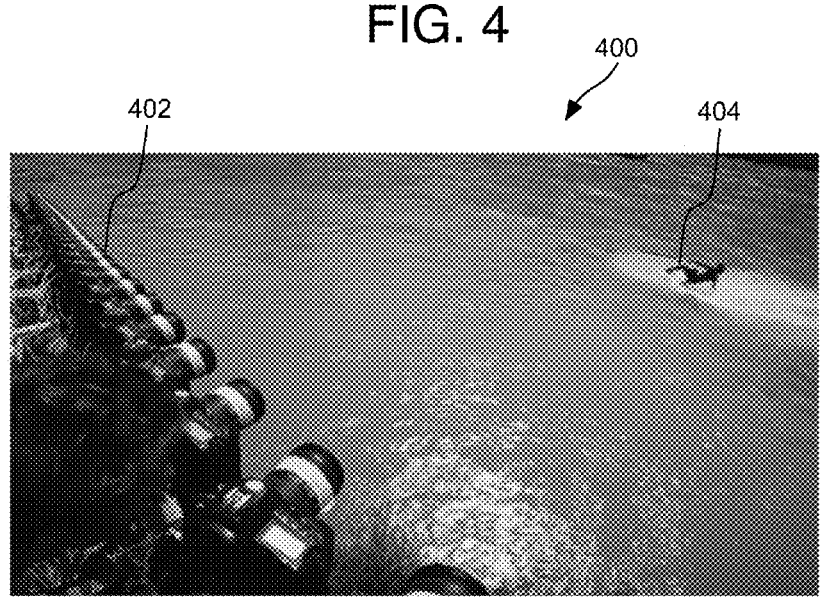
FIG. 4 is a photograph of a linear array along a path of a dynamic object to be recorded.

A number of disadvantages to these solutions also exist, however. Conventionally, such systems capture real 3D video by placing several cameras in static positions and synchronizing the cameras' locations (including the cameras' positions (locations and/or orientations, etc.)) in advance of the actual recording of the object. In other words, the cameras' locations are synchronized usually once prior to the shooting and then remain static. This creates a constraint on the scene since the objects are limited to the location in front of the static cameras, typically a closed area when the cameras encircle the object being recorded. A static camera setup can be very problematic under certain scenarios. For example, an athletic or sporting event may have a dynamic scene that moves fast such as when a person of interest progresses through a space, such as with a skate boarder or skier. For this scenario, the system may attempt 3D reconstruction of a video sequence of a moving person. Under the known setup, the entire camera array is required to be mobile and move along with the scanned object. Otherwise, the scenario would require an enormous camera array covering the space in which the person of interest moves, which may be practically impossible when the area for the athletic event is relatively large or not in an enclosed area. In either way, the setup is both extremely costly and requires major effort to arrange the camera array and synchronize the locations of all of the cameras. FIG. 4 shows a system 400 with such an expensive linear camera array 402 capturing a moving object (the water skier) 404, and most likely only one side of the water skier and a small portion of the skier's total path.

Also, when a 3D video capture is performed by shooting a scene using several static cameras, this arrangement often requires the cameras to be at exact known positions that are measured carefully prior to the image capture such that the construction of the camera array and the enabling of the recording of the exact camera positions may be very labor intensive. Existing solutions for 3D scanning and reconstruction of objects are limited in their abilities to scan a dynamic 3D object as it moves in the scene. The solutions in the current state of the art require expensive equipment along with significant effort in pre-installation of the cameras. Thus, the pre-positioning of the cameras is usually a costly task, and in certain cases, the pre-positioning of the cameras to obtain a global capture (360 degrees) may be practically impossible as shown in FIG. 4. Thus, the static camera setup typically provides a partial coverage of the scene at hand, rather than a desired global coverage, depending on the number of cameras and the camera array's overall field-of-view.

Another shortcoming is that static non-depth RGB camera array systems often merely provide the ability to perform only a "one-shot" 3D reconstruction for a certain frame taken at time t. In other words, such cameras must surround the object being recorded from all angles and for each frame or time a picture or video is taken.

Another problem inherent to state-of-the-art static camera methods for 3D viewpoint interpolation is the localization of multiple RGB cameras in one shared local coordinate system in order to enable accurate interpolation. In the static camera arrays, the locations and orientations of the cameras may be preset so that localization is already established. Localization here refers to determining at least a coordinate location (and orientation where relevant) of the camera relative to other cameras of a camera array. For a dynamic camera array where each camera can move independently relative to each other camera, however, there is no existing way to localize dynamic cameras (relative to each other) without great expense and with high accuracy. For example, a system that could use sensors on the cameras such as a GPS, altimeter, magnetic and gravity field sensors, and so forth to provide the locations and orientations from multiple moving cameras would use expensive sensor equipment, and either be too imprecise (such as GPS) or too precise such that very small errors in location or orientation will cause very large errors in the output. Conventionally, the 3D systems that obtain precise locations of objects and/or cameras use trackers and enormous number of surrounding cameras at fixed locations as described herein. Thus, the existing systems are not practical, extremely costly, and/or inaccurate to capture images sufficient to create a 3D space to form virtual views.

These disadvantages are resolved by the disclosed 3D image capture method and system using dynamic camera arrays leveraging depth data for position registration both from frame to frame in a video sequence of individual cameras and from camera to camera to efficiently and accurately generate 3D data of an object being captured by the camera array, thereby eliminating the constraints of a static camera array and consequently reducing complexity and cost of interpolation for 3D view points between the camera images. Thus, the disclosed 3D image capture method can shoot real-time 3D video in an unconstrained environment where cameras cannot be static in order to create a sufficiently useful 3D space. This enables the shooting of a moving object with "low cost" equipment.

It should be noted that for clarity, the term position will be used to generally refer to both coordinate location and rotation (or either of them) of a camera, while the term location generally will be considered to refer just to a coordinate location of a camera. Further, for clarity herein, the term registration will usually refer to registering coordinates frame-to-frame along a video sequence or time-wise, while the term alignment will usually refer to camera-to-camera or sequence-to-sequence coordinate registration, even though the two terms otherwise may be used interchangeably.

Referring to FIG. 5, process 500 is provided for a method and system of 3D image capture with dynamic cameras. By one form, and in the illustrated implementation, process 500 may include one or more operations, functions or actions 502 to 506 numbered evenly. By way of non-limiting example, process 500 may be described herein with reference to example image capture processing system 1000 of FIG. 10 where relevant.

Process 500 may include "obtain image data including depth data of sequences of frames of at least one scene, wherein individual sequences are captured from individual cameras of a plurality of cameras" 502. Particularly, this may include providing a dynamic camera array or a static camera array whether or not the positions (including the locations and the orientations) of the cameras are known, as explained in greater detail below. Each camera may be independently filming a video of a common object or common scene so that each camera provides its own video sequence of frames of the object or scene. The image data that is provided from the cameras then may be, or include, chroma and luminance pixel values. The values may have been pre-processed, also as mentioned below, sufficient to provide individual camera depth maps where each pixel has a three-dimensional coordinate to form a three-dimensional space of individual frames. The details are discussed below.

Process 500 may include "determine the location of the image data of the sequences of frames on a shared three-dimensional coordinate system of the plurality of the cameras by using the image data of multiple frames to determine the location of the image data on the coordinate system" 504. Specifically, by using the image data, and particularly the depth maps, of the frames, a point or cloud-point registering technique such as iterative closest point (ICP) algorithms may be used to determine the differences between points of the content in the images and of different frames. This may be performed twice. First, such an ICP technique may be used between frames of different times along the same sequence of frames from a single camera. By one form, this is performed on two frames in a sequence that have overlapping fields of view such as consecutive frames of a sequence, and in one example, all pairs of consecutive frames. Second, frames from two different sequences, and in turn from different cameras, then may be searched to find a sufficiently overlapping field of view so that a shared coordinate system may be formed for the two frames. By one form, the ICP or such algorithm may generate a transform matrix or other coefficients to modify the coordinate system of one frame in one sequence to that of another frame in another sequence. Once an alignment is found between two different overlapping frames of two different sequences, the coordinate axes of one of the frame sequences may be matched to the other frame sequence so that all of the frames on all of the aligned frame sequences now have one shared coordinate system. Once the shared coordinate system is constructed, virtual views may be formed within the 3D space of the shared coordinate system, and the shared coordinate system may be anchored to real world coordinates.

As one advantage of this process, process 500 may include "wherein the location of the image data on the shared coordinate system is determined without determining values of the positions of the cameras before the capture of the sequences of frames in order to use the values of the positions in computations to determine the location of the image data on the shared coordinate system" 506. Specifically, one advantage of the present method of 3D image capture is that dynamic cameras may be used around an object being filmed (or recorded or captured) where the cameras may move to unspecified positions about the object, and despite this ambiguity, a 3D space still can be generated positioning the filmed objects within the 3D space. This results in a 3D space that can be used to generate virtual views. It should be noted, however, this does not eliminate all pre-setting of camera positions before the image capture by the cameras. In other words, the positions of the cameras still may be planned or may even be fixed (where static cameras are not moving), except that those pre-set camera positions, in the form of some sort of position values, are not used to calculate the image data locations later for the present method and system disclosed herein. The present method and system has no need for the actual or calculated pre-set position values, and intentionally foregoes the use of those values, at least to calculate some of the camera image data locations relative to locations of other image data of other cameras. Such a system provides an efficient way of 3D space generation for video sequences from many different dynamic camera configurations including those with unpredictable camera positioning.

Figure 6A:
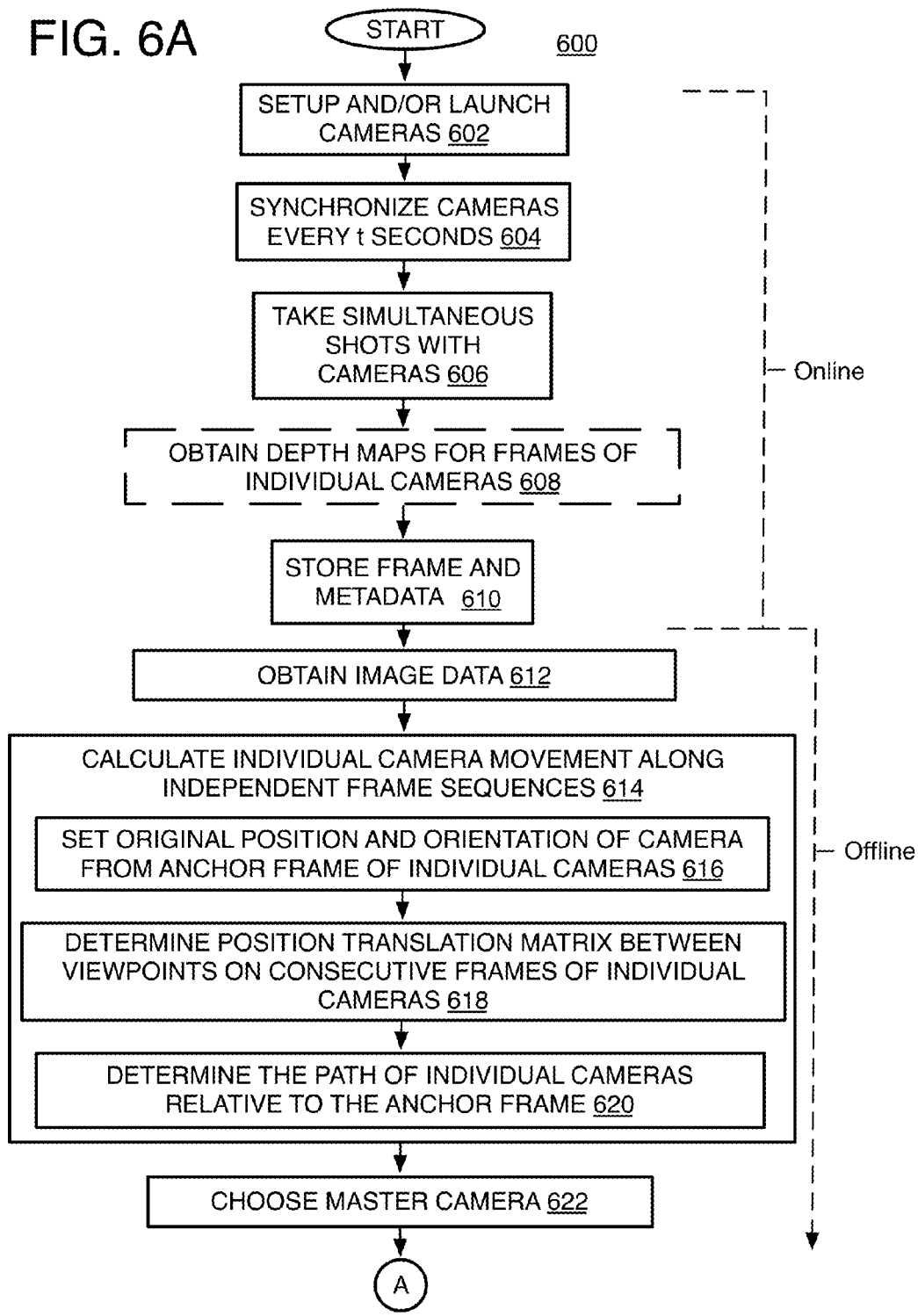
FIGS. 6A-6B is a detailed flow chart for 3D image capture for dynamic cameras.
Figure 6B:
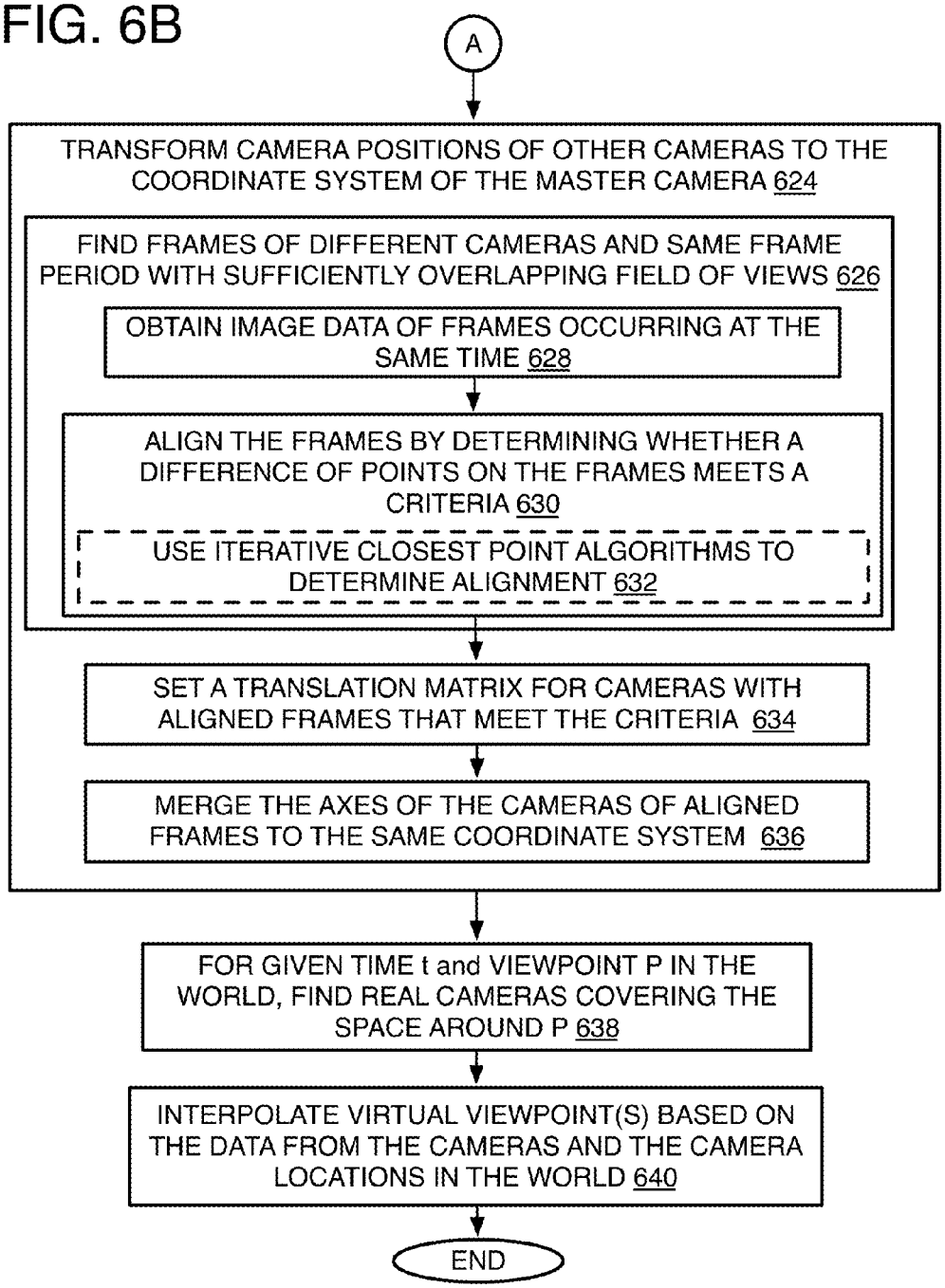

Referring now to FIGS. 6A-6B, process 600 is provided for a method and system of 3D image capture with dynamic cameras. In the illustrated implementation, process 600 may include one or more operations, functions, or actions 602 to 640 numbered evenly. By way of non-limiting example, process 600 may be described herein with reference to example image capture processing system 1000 of FIG. 10, and where relevant.

The 3D image capture process may be divided into an online portion and an offline portion. The online portion generally refers to the setup of the cameras and the operations that occur while the cameras are capturing images. Thus, during the online portion, the operations of the process may occur at the cameras that are being used, either individually or cooperatively depending on the operation. Accordingly, operations that occur after image capture and most likely operations that use a download of data from multiple cameras, may be considered offline operations. It will be understood, however, that the online and offline operations could overlap, such that offline analysis of captured image data near the beginning of a video sequence may start before the completion of all image capture of the video sequence by the cameras. Also, while the online operations suggest operations performed by processors at the cameras while offline operations suggest operations performed at a processor separate from the cameras, this also need not always be the case. One or more of the cameras, labeled a main camera just for processing purposes for example, could be performing the offline 3D image capture operations as well.

Process 600 may include "setup and/or launch cameras" 602. In more detail, the method and system may include a set of time synchronized RGBD dynamic cameras where each camera may be free to move around to capture the scene in front of the cameras. The cameras may be either hand-held or mounted on some robotic device which can be either a flying drone or any type of mobile or moving device whether a ground, surface crawling, water, air, or space vehicle that can be controlled. This may include cameras that are fixed in location but are free to rotate to change the orientation of the camera or vice-versa.

Figure 7:
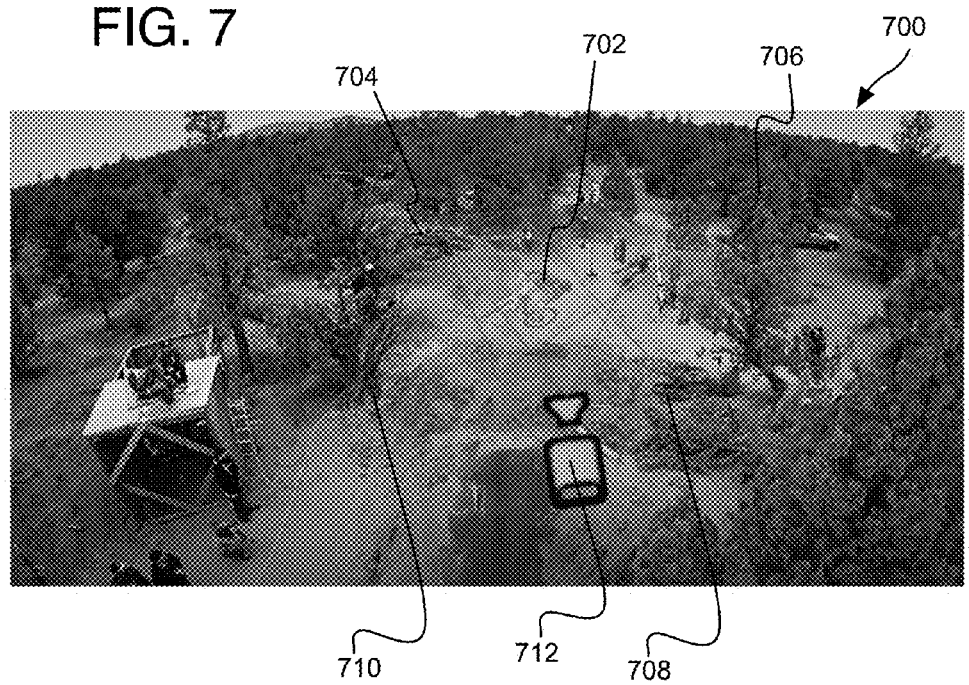
FIG. 7 is a marked-up photograph showing positions of dynamic cameras for 3D image capture of a dynamic object.

Referring to FIG. 7, one example setup of a camera array 700 for capturing images of a scene or object 702 (in this case, a moving or jumping motorcycle) may include four image capture devices 704, 706, 708, and 710 with dynamic RGBD cameras mounted on flying drone robots to provide three dimensional viewpoint interpolation. The cameras may be held relatively still around the object or may move along with the object. As described below, once the data from the cameras is analyzed, a 3D space may be formed, and virtual cameras 712 may be formed to effectively generate an image, through interpolation, from a perspective that is different from the perspectives of the four cameras.

For hand held-cameras, another alternative setup can include people holding the cameras and scanning the dynamic target object. The cameras may include anything from smartphones to professional video or still shot cameras as long as time synchronized digital data of the captured images can be collected. The people may move along with the object as the object progresses in the scene. Under this setup, each person holding a camera, such as an RGBD camera device, simply may be required to keep the object in the camera's field of view.

It will be understood, however, that the present methods could be applied to a static camera array that does not move in location and/or orientation even though the present methods are not limited to any such fixed camera arrangement. In such examples, the cameras may be arranged on stands, and around a sporting event or surround some other object in motion for example. Many other examples exist.

Also, in many of the examples provided above, whether for dynamic or static cameras, the motion or placement of the cameras during the capturing of the images still may be planned ahead of time. This may include some general plan or notion simply discussed with the operators of the cameras or robots or vehicles holding the cameras to keep the object being filmed in view, up to very precise planning for pre-arranged camera locations and orientations with calculated position values. It will be understood, however, that for the present method and system that the calculation of the subsequent 3D space may be completely separate from any planning stage. Thus, the present method is able to generate a 3D space without using any camera position values determined in a previous planning stage. Accordingly, in one example form, the present method has no use for any such camera position values to generate the 3D space to be used for subsequent interpolated virtual camera perspectives or other uses, and the method and system herein are particularly beneficial in situations when it is practically impossible to plan the positions of the cameras ahead of time sufficient for 3D space generation.

Process 600 may include "synchronize cameras every t seconds" 604, and particularly, so that the cameras are taking pictures, or capturing frames, substantially at the same time, and have matching frame rates. Since the cameras are moving, or could be moving, while shooting a dynamic scene, the cameras may be localized on a per-frame basis so that frames that occur at the same time may be used to generate a shared 3D coordinate system. Frame rate synchronization can be performed by various known methods such as server-based synchronization where the cameras communicate with one server (or one main camera or other processing control or base) that triggers the individual cameras to capture each frame in sync. By one example option, a clock signal is transmitted from the server to individual cameras that adjust their clocks to match the clock of the signal, and a particular frame rate is pre-established relative to the clock. Each camera may have its own clock that is used to maintain the image capture at some rate such as 30 frames per second, but these clocks have small delays between each other so for a long time period these delays (differences) will cumulate to large delays. Thus, at selected time intervals (such as every few seconds for example), the server may send a re-sync signal to maintain the differences among the cameras within acceptable bounds. By other examples, the server may simply issue a command to perform an immediate image capture upon every time the signal is received by a camera. In this case, the participating cameras receive sync commands every t milliseconds, triggering the cameras to take a frame in a time synchronized manner. Thus, signal also may be considered, or may include, a re-sync command as mentioned for the other option. Other variations are also contemplated.

Process 600 may include "take substantially simultaneous shots with cameras" 606. Thus, as mentioned, the cameras may be synchronized by time to take a set of images of an object or scene in front of the cameras. The cameras may be moved, or not, as described above while capturing the images and while attempting to maintain the object or scene in front of all of the cameras being used and at substantially all times, or at least as much as possible. This is performed whether or not the scene or object being filmed is moving.

By one form, in order to better ensure that the 3D generation calculation can be performed, the field of view of the frames in a video sequence from each individual camera should have an overlap from frame to frame, and by one form, at least about a 40% overlap (or about a 40% to about 55% overlap). This is needed in order to better ensure that a sufficient number of points may be found to calculate a 3D space from point or point-cloud registration methods such as iterative closest point (ICP), as well as to ensure the entire area that may be needed for generating virtual views is present. Thus, if holes exist in the overall view of an object where no image capture covers the object, no points exist at those holes to build an interpolated view. Here, overall view refers to a 360 degree view (or circle) around an object on at least one plane to form a circle of horizontal views as in FIG. 1, but ideally includes the view of the object from all angles (as from cameras positioned spherically about the object) but which typically is not always possible.

Thus, first, it is desirable to have this overlap of field of view from frame to frame in a single video sequence from a single camera, and for each camera being used. It is assumed movement of the camera is sufficiently slow compared to the cameras' frame rate to enable shared field of view of the same camera between two consecutive frames. Specifically, due to the typical video frame rate (such as 30, 60, or 120 fps) that would be maintained for the cameras being used relative to the much slower speeds cameras typically may move such as by robot, drone, or vehicle holding the camera, it is assumed that a significant overlap exists from frame-to-frame within the same video sequence from a single camera. Under this assumption, the movement of the camera can be traced during the entire shooting sequence considering a delta movement between each of the two neighboring frames as long as the individual cameras are moving sufficiently slow to provide overlapping field of view between two consecutive frames in a sequence of frames from a single camera.

Then, as explained in greater detail below, this overlap is also determined between frames taken at the same time point but from different video sequences of different cameras in order to generate the basis of the shared 3D coordinate system. Thus, after the video sequences have their frames registered frame-to-frame along the sequence to form a single axes or coordinate system for the sequence, a frame from one registered sequence may be aligned with a frame from another registered sequence. Once there is a single sufficient alignment of two frames from different cameras, the entire video sequence from those two cameras can now share the same 3D coordinate system. The shared field of view relied on between the cameras at a certain time t also assumes each camera moves sufficiently slowly to facilitate the overlap. This can be arranged by either providing audible/visible on screen indications to people holding the cameras or any feedback mechanism for synchronized robot/drone movement when present.

Referring to FIG. 8 as one example of the use of the field of view (FOV) overlap from camera to camera, a multi-camera array registration 800 may be used to demonstrate one possible operation of camera array 700 with four cameras now labeled cameras cam1 to cam4. Assume the four cameras (Cam1, Cam2, Cam3, and Cam4) are shooting an object in motion while synchronized in time but not in space. At the first frame (frame 1), the field of view of cameras 1 and 2 (i.e., Cam1 and Cam2) overlap (forming a camera group 1) and may be aligned. Once the fields of views of the cameras overlap (as with Cam1 and Cam2), it is now possible to align the video sequence of frames of Cam1 and Cam2 at all of the other frames of the video sequences of Cam1 and Cam2. The alignment occurs by computations explained below.

Figure 9:
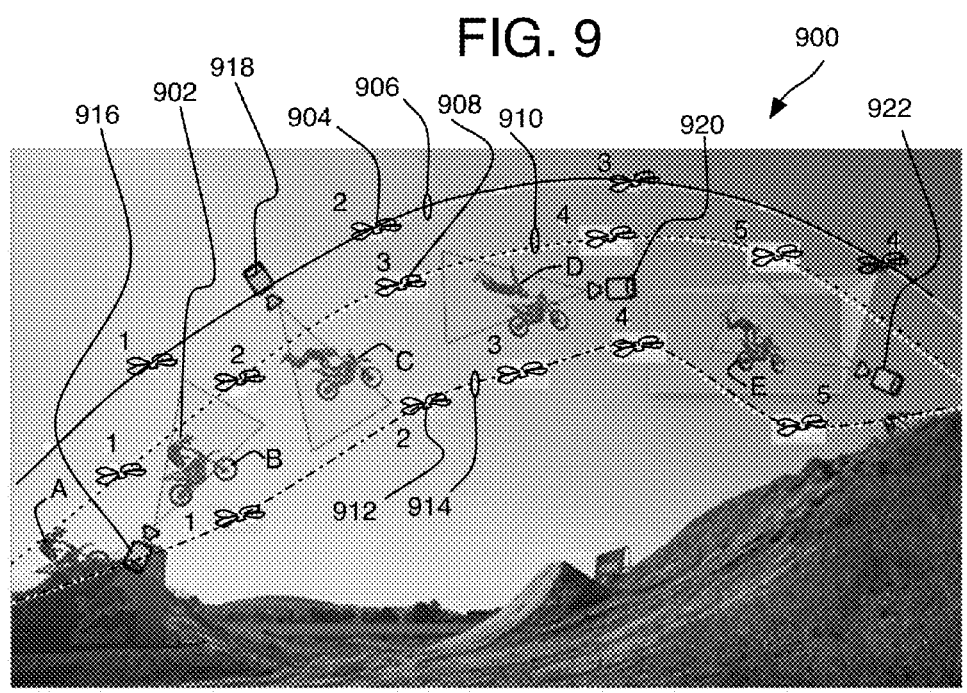
FIG. 9 is a marked-up photograph showing dynamic cameras performing 3D image capture of a dynamic object.

Thus, continuing with the example of the camera array registration 800, at frame 1, Cam1 and Cam2 may be used to generate a common coordinate system while Cam3 and Cam4 are neither aligned between themselves nor with Cam1 and Cam2. Assume that at frame 10, field of view of Cam3 overlaps with field of view of Cam4 (forming group 2). Since frame 10 includes an overlap, Cam3 and Cam4 now may be aligned, and the common coordinate system may be valid for all future and previous frames of Cam3 and Cam4. Then assume Cam 1 and Cam 3 at frame XXX have overlapping fields of view and may be aligned (or in other words group 1 and group 2 overlap). Once Cam3 and Cam1 are aligned, all four cameras may be localized into one shared coordinate system as explained below Referring to FIG. 9, another example camera array 900 is provided to demonstrate the synchronized image capturing as well as individual video sequence capture of each camera. In more detail, image capture array 900 is arranged to record a moving object 902, here a motorcycle moving through a jump off of the ground. The camera array 900 may have flying devices or drones with cameras (which may be simply referred to collectively as cameras) including a camera 904 moving along path 906, a camera 908 moving along a path 910, and a camera 912 moving along a path 914. The cameras 904, 908, and 912 are generally moving along the path of the object 902, and the positions where the cameras have captured an image and created a frame of image data are numbered 1 to 4 along each path 906, 910, and 914. Subsequent camera positions 5 are also shown for a couple of paths as well. At each position 1 to 4, each of the three cameras captured an image of the object from a different perspective, and the cameras collectively captured the image at the same time at the same position number. For example, all three cameras 904, 908, and 912 captured an image of the object 902 at the same time when at position 1, and so on. The images captured at these positions may be numbered in order for each camera (i.e., Frame1, Frame2, Frame3, Frame4, and so on). Once the frames are analyzed and a 3D space is generated as described below, the interpolated positions of three virtual cameras (or actually the position of the interpolated views of three virtual cameras) 916, 918, 920, and 922 may be determined. The details are as follows.

Process 600 may include "compute depth maps for frames of individual cameras" 608. Preliminarily, this operation may include obtaining raw image data once the images are captured by the cameras. Thus, the cameras either may transmit the raw image data to another main processor or may perform pre-processing at least sufficient for depth map generation for each of the frames. The raw data may include RGB color space frames, but can also be HSV or any other color space that the cameras support. The transitions between one color space to another are trivial, so it is assumed that RGB data is used. This operation also may include obtaining metadata for each frame that, in one form, at least includes timestamps for each frame. The pre-processing may include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth.

Once the image data is ready for depth map calculations, depth image data may be determined for a single camera. Some methods use stereoscopic or triangulation systems with RGB data or infra-red (IR) data for example where, here a single camera refers to a single device with multiple closely spaced cameras on it, such as on a smart phone, to provide the depth map. Other stereo methods may actually use two cameras in the array to establish a depth map for a single camera with the location and orientation between two cameras is known (which may be the rare case in the examples provided herein). By other example, depth measurement is performed by using methods that can be performed on a single camera rather than the use of triangulation from a stereo camera system with multiple cameras when the positions of all of the cameras relative to each other are not yet known such as when multi-cameras on a single device are not being used. Such single camera 3D or depth map computations may include time-of-flight, structural, or coded light technologies. A table or depth map of depth values for each pixel value (or in other words, the formation of 3D (x, y, z) coordinates) for the content at each pixel forms the depth image data or depth map for a single frame.

Process 600 may include "store frame and metadata" 610, and particularly where it will be accessible or at a main processor, hub, main camera or other locations that is to receive the depth maps (or image data to compute the depth maps) from each of the cameras that form a camera array capturing images of the object. Timestamps are recorded in order to temporally align the video sequences from the different cameras.

In the post-processing or offline stage, the cameras are localized (as described herein) in order to extract a 3D video capture in sufficient detail at least so that virtual camera positions can be interpolated to different positions around a scene. As mentioned, this may include a multi-camera registration process performed offline either after all of the 3D capture of a scene is completed, or at least after some of the frames are captured so that 3D space generation may be performed on a beginning part of captured video sequences while image capture data is still being collected for the video sequences for example.

Process 600 may include "obtain image data" 612, and includes obtaining the frames of image data from memory as well as the timestamps to show when and the order in which the frames were captured. As mentioned this data may be located at a main control remote from the cameras, may be local on a main camera, or other location. The data may be provided to the processor(s) whether a CPU, GPU at an image signal processor (ISP) or other type of processor discussed elsewhere herein and that will perform the frame-to-frame registration of images to form the 3D space whether at a server or one of the image capture devices.

Depth image registration may be used to position (or localize) the cameras in one shared coordinate system that is based on the coordinates of one of the participating cameras or the object in the scene. Depth data or depth maps of each frame may be used for the registration as long as each frame has overlapping fields of view as mentioned above. Also, by one technique, the frame registration is used in two different modes of registration. One is from frame-to-frame temporally and independently along a single video sequence from a single camera. This is performed for each camera providing images and is called frame sequence registration herein. The result is coordinates or axes for multiple frames of a frame sequence that is used over time. The other application of the registration is from frame to frame of the cameras that share part of the field of view with frames of another participating camera. This operation is referred to as camera alignment. It will be understood that these operations may be relatively independent such that either operation may be before the other operation. In the example provided below, frame sequence registration is performed first, and then the camera alignment is performed.

Process 600 may include "calculate individual camera movement along independent frame sequences" 614. By one example, frame sequence registration is performed by using the depth maps of multiple pairs, or each pair, of consecutive frames in a video sequence for an individual camera, which may be labeled frame(t) and frame(t+1) for example. This is then performed for each camera of the camera array providing images of the object or scene. This may be used whether or not the camera(s) was actually moving, and whether or not the camera was following a specific object in the scene or not. As mentioned, this assumes that the viewpoint from frame to frame does not change more than about 60% by one example, or that at least about a 40% overlap (or about 40% to about 55%) is present from frame-to-frame of consecutive frames in the same video sequence.

With the depth image data from consecutive frames providing two different viewpoints, a point-cloud registration method such as ICP may be used to convert the coordinates of one frame to the coordinates of the consecutive frame, and may be performed for each frame. One such ICP method is disclosed by Besl, Paul J.; N. D. McKay (1992). "*A Method for Registration of 3-D Shapes*". *IEEE Trans. on Pattern Analysis and Machine Intelligence* (Los Alamitos, Calif., USA: *IEEE Computer Society*) 14 (2): 239-256. Doi:10.1109/34.121791). Basically, this method finds the closest point in a reference point cloud in one frame to a point in a source point cloud of another frame. A means-square-error (MSE) function then may be used to best align the two clouds (or two frames). A transformation matrix then may be formed to convert the coordinates from one of the frames to that of the other frame. This process may be repeated using the new coordinates for the frame until some registration threshold is reached. The registration threshold is set based on the desired overlap from frame to frame. The registration threshold may be set by determining an optimal value through trial and error and will depend on the particular arrangement of cameras and operations in the offline process. By one example, the registration threshold would be set by checking the result of one perfect (or close to perfect) registration and accepting a certain percentage within the threshold such as 0.9*result. This registration threshold value then may be valid for the entire process going forward for a certain camera arrangement. If the registration threshold cannot be reached, then there is insufficient overlap between the two frames and the frames cannot be registered. It will be understood that for the first part of the process (frame sequence registration) this will be highly unlikely as mentioned above, but that the determination of the threshold will be more important for camera alignment between different cameras. The result here is a final transformation matrix that will convert the coordinates of one frame (frame(t)) to the coordinates of another frame (frame(t+1)).

It will be understood that instead of consecutive frames, the frame registration and coordinate conversion may occur between other frames along a sequence, such as certain intervals (every $3^{rd}$ frame) in order to reduce the computation load for example. Other examples are also contemplated. This load reducing strategy may be used as long as the minimum overlap between the frames is maintained.

Process 600 may include "set original location and orientation of camera from anchor frame of individual cameras" 616. In one form, the first frame of the video sequence, and here each video sequence, may be considered the anchor or key frame, and in turn the frame that indicates the original location and orientation of the camera. This may set the coordinate axes for the video sequence, and each frame in the video sequence that is being used will have its coordinate system directly or indirectly converted to that of the anchor frame by having its coordinate system registered to the next previous frame (or previous by some interval) in the video sequence to a current frame.

Process 600 may include "determine position translation matrix between viewpoints on consecutive frames of individual cameras" 618. Accordingly, the result of the frame sequence registration is a set of matrices for converting the coordinates between pairs of consecutive frames along the video sequence. Then, process 600 may include "determine the path of individual cameras relative to the anchor frame" 620. Thus, each camera video sequence is obtained, and the camera position per frame (delta position from the previous frame) is calculated by depth image registration between two consecutive (or other interval) frames. Multiple, or all, of the translation matrices of the frames of a video sequence are used to calculate the camera's relative path (location and rotation) defined by positions [P(0), P(1), . . . , P(N)]. Each location and rotation in time t is calculated by activating the calculated transform $T_{t-1}$ on the location and rotation of time t-1. Again, this may be repeated for each or multiple cameras.

Process 600 may include "choose master camera" 622. The Master camera can be chosen randomly, or by some other selection process that is convenient. The position of the master camera is used as the 0 position of the shared coordinate system. The coordinate axes of the master camera, or more specifically, the coordinates and axes of the frames of the video sequence of the master camera becomes the shared coordinate system. Thus, the other cameras' movements are determined relative to the coordinates and axes of the master camera. It will be appreciated that upon selection of the master camera, if a sufficient overlap and alignment of any of the frames in the video sequence of the master camera with any frame of another camera cannot be found, a different master camera could be selected. In that case, the positioning of the camera would be inadequate for 3D space generation, and the images from this camera should be excluded from the calculations.

By other examples, instead of selecting a 0 position at a master camera, the 0 position of the shared axes and coordinate system is based on the location of the object instead. The details are explained below.

It will also be appreciated that the 0 position (0, 0, 0) of the final resulting shared coordinate system could be another point away from a main object being filmed and away from the cameras as long as some set point of the shared coordinate system at one of the cameras is used as the basis for registering the cameras to the shared coordinate system.

Process 600 may include "transform camera positions of other cameras to the shared coordinate system of the master camera" 624. Thus, next in the alignment stage, the process attempts to find two relative paths that "collide", or in other words, see the same object from sufficiently similar, close points of view of two frames from two different cameras but at the same timestamp. Thus, the cameras' video streams are analyzed and compared with respect to one another to recognize overlapping fields of views. The two cameras must share overlapping fields of view between them so that the coordinates of one frame from one camera may be converted to the coordinates of another frame from another camera, and in one form to the coordinates or axes of the master camera to enable 3D viewpoint interpolation.

More specifically, process 600 may include "find frames of different cameras and the substantially same frame period with sufficiently overlapping field of views" 626. This may include "obtain image data of frames occurring at substantially the same time" 628. Thus, the video streams are obtained from multiple or all cameras and then matched according to the frames' timestamps. This may be performed by grouping frames with timestamps that are the same or sufficiently the same where differences are considered negligible.

Process 600 then may include "align the frames by determining whether a difference of points on the frames meets a criteria" 630. Two cameras may be selected, one of which may be the master camera. By one example, a search may be performed to find two frames of the two cameras and with the same timestamp that are sufficiently overlapping so that the two frames can be aligned. Thus, process 600 may include "use iterative closest point algorithms to determine alignment" 632. As with the frame sequence registration, for the camera alignment of the paired frames, a frame of the master camera is selected and compared to the frames of the same timestamp. This is repeated until the alignment of two frames meets a criteria (such as an alignment threshold). The alignment threshold may be determined by trial and error as explained for the frame sequence registration threshold described above. When a result of the alignment calculation indicates a confidence alignment threshold is reached, process 600 may include "set a translation matrix for aligned frames that meet the criteria" 634. The translation matrix transforms a 3D object from one view point (a first camera) to another viewpoint (a second camera) assuming both cameras are pointed at the same object with sufficient area of congruence such that the transform matrix indicates the location of the image data of the second camera, and in turn the second camera's position, with respect to the location of the image data of the first camera, and in turn the position of the first camera.

This may be repeated for each pair of cameras until all of the cameras used in the camera array have a transform matrix with at least one other camera of the aligned cameras (for example, camera 1 is aligned with camera 2, camera 2 is aligned with camera 3, camera 3 is aligned with camera 5, and camera 5 is aligned with camera 4, and so forth). Once the transform matrices between multiple cameras are formed, the coordinates of any camera with a transform matrix to one camera in a group of aligned cameras can be converted to the coordinates of any camera in the group of aligned cameras. For example, the transform matrices can be concatenated such that if coordinates of camera 3 are converted to coordinates of camera 2 by transform matrix M1, and coordinates of camera 2 are converted to coordinates of camera 1 (such as a master camera) by transform matrix M2, then camera 3 coordinates can be directly converted to camera 1 coordinates by M1*M2. Thus, the cameras need not be aligned in any particular order as long as the master camera is one of the aligned cameras. Also, each of the aligned pair of frames for different cameras need not all be at the same timestamp as long as each frame in a compared pair of frames is at the same timestamp as explained with FIG. 8.

Process 600 may include "merge the axes of the cameras of aligned frames to the same coordinate system" 636. As mentioned above, once the transform matrix is established between two frames from two different cameras at one specific time, the coordinates and/or axes of any frame of one of the cameras from any other time can be converted to that of the other camera of the pair of cameras. Another way to state this is that the axes of the two cameras can be merged to a single shared coordinate system. Then, in turn, all of the cameras can have their axes converted to that of the shared coordinate system, and by one form, based on the coordinate system of the master camera. The result is a 3D space with sufficient detail and coverage to provide interpolated images from virtual camera positions, and all based on point matching algorithms that align the independent video sequences from different cameras in both time and space.

It will be understood that the shared coordinate system could be that of the object instead of a master camera so that the cameras are localized relative to the object axes. This is accomplished by using conventional object tracking algorithms to obtain the object's location in space in the coordinate system of the camera looking at it can be obtained (and in turn, the camera's location in respect to the object is obtained according to the methods herein). The object's location includes translation (from the camera) and rotation.

Process 600 may include "for given time t and viewpoint P in the world, find real cameras covering the space around P" 638. Thus, by one example, the virtual camera, or location of a virtual image, is first selected based on world coordinates. These world coordinates are then converted to the coordinates of the shared coordinate system in order to locate the desired image perspective relative to the perspectives by the cameras in the camera array. By one form, a user or automatic system may select world coordinates that position a frame for a picture or view of the object or scene, and the position of the frame is translated to the coordinates of the shared coordinate system depending on the position of the frame relative to the cameras or the object (or scene).

Process 600 may include "interpolate virtual viewpoint(s) based on the data from the cameras and the camera locations in the world" 640. Interpolating virtual viewpoints may be performed either with respect to the moving camera chosen as the master camera, or with respect to the object itself that is being tracked. By one form, the virtual viewpoint may be set with respect to the 0 position of the shared axes and coordinate system of the camera array and/or object being captured. Also as mentioned, the virtual viewpoints will only be as good as the coverage of the images from the actual cameras, such that overlap of images without missing areas or holes may provide a high quality image from a virtual viewpoint.

Since the disclosed localization method leverages from depth data (depth based image registration), this method performs well without the need of prior knowledge of camera location constraints. The localization is based on a shared coordinate system of the object in the scene or one of the participating cameras, and rather than requiring world coordinates. The present method eliminates the requirement of the costly preparation of setting up a large quantity of pre-installed static cameras. Instead, a minimal set of dynamic cameras may be used to follow a dynamic object being shot. Thus, the present method enables dynamic 3D capture at locations where current methods cannot be used because it is practically impossible to install static cameras prior to the shooting and that can still provide a sufficient 3D space at least for virtual camera generation. Since the solution here does not require pre-positioning of cameras, it facilitates a robust, more efficient, and cost-effective 3D video capture.

Referring to FIG. 10, process 1000 illustrates the operation of a sample image processing system 1100 that performs 3D image capture with dynamic cameras in accordance with at least some implementations of the present disclosure. In more detail, in the illustrated form, process 1000 may include one or more operations, functions or actions as illustrated by one or more of actions 1002 to 1016 numbered evenly. By way of non-limiting example, process 1000 will be described herein with reference to FIG. 11. Specifically, system 1100 includes logic modules 1104. The logic modules 1104 may include a 3D space generation unit 1114 with a frame sequence space unit 1116 and a camera alignment unit 1118. The operation of the system may proceed as follows.

Process 1000 may include "obtain depth maps and timestamps of captured frames of video sequences from cameras of a camera array" 1002, and as described above, the cameras may be dynamic cameras where the positions of the cameras are not planned or specified before filming an object or a scene.

Process 1000 may include "select anchor frame for a video sequence" 1004 and particularly to provide the basis of the coordinate axes for the video sequence. This may be the first frame in the video sequence.

Process 1000 may include "select two frames of the video sequence of the same camera with the anchor frame" 1006. By one example, this is two consecutive frames. By other examples, the frames could be separated by some interval. The first time this operation is performed for a video sequence, one of the frames should be the anchor frame. After that, one of the frames already registered in the video sequence should be one of the frames.

Process 1000 may include "determine the coordinate axes of individual video sequences by comparing points of one of the two frames with points in the other of the two frames" 1008, and particularly to perform frame sequence registration. This comparison is performed by using ICP as mentioned above, or by using some other similar algorithm. This operation may include determining a transform matrix or coefficients for converting the coordinates of one of the frames of the pair of frames to the coordinate system and axes of the other frame along the same video sequence.

Process 1000 may include "end of video sequence?" 1010. If not, the next pair of frames is obtained 1012, and the frame sequence registration operation is repeated at operation 1008 until all frames in the video sequence are registered to a single coordinate axes system for the video sequence.

If so, process 1000 then may include "all video sequences with frame registration?" 1014. If not, the process obtains another video sequence 1016 of another camera and that does not yet have its own frames registered to a single axis system, and repeats to operation 1004. If so, the process proceeds to begin camera alignment operations 1018.

Process 1000 may include "group frames from different video sequences that have the same timestamp" 1020. This is performed to determine which two frames may be selected for alignment and coordinate conversion ultimately to the shared coordinate system.

Process 1000 may include "perform comparison of points of two frames of different video sequences with the same time stamp" 1022. Now, the frames from different cameras except with the same timestamp are compared, and the coordinates of one of the frames may be converted to the coordinates of the other frame, and in turn directly or indirectly converted to the coordinates of a single shared coordinate system. This may or may not include first selecting a master camera which may be the basis of comparison for all of the video sequences as well as the 0 position of the shared coordinate system being established. The master camera would provide one of two first video sequences selected for comparison. As with the frame sequence registration, this also includes using a point or point-cloud comparison algorithm such as ICP. The comparisons between two frames are performed (or iterated) until a criteria is satisfied such as the differences of the points meeting a threshold. The threshold is discussed above with process 600. Once the criteria is satisfied, the transform matrix used to satisfy the criteria for the pair of frames being compared is set as the final transform matrix to align the axes of the video sequence of one of the frames, and in turn one of the cameras, being compared and with the axes of the video sequence of the other frame, and in turn other camera, in the comparison.

Process 1000 may include "at least one frame from each video sequence aligned?" 1024. If not, the operation obtains a frame from the next video sequence 1026, and the process is repeated at operation 1022. If so, process 1000 then may include "merge coordinates and axes to a single shared coordinate system" 1028. Thus, the axes of each video sequence is converted to the axes of the shared coordinate system, and in turn, the coordinates of each frame may be converted to the coordinates of the shared coordinate system. It will be understood that by one form, all shared coordinate system coordinates may be pre-calculated for all frames in the video sequences and provided for a single 3D coordinate system. It will be appreciated, however, that the 3D space could be presented by providing the axes and the shared system coordinates for one video sequence, the original coordinates of the other video sequences, and the transform matrices to convert those coordinates to the shared coordinate system instead. This way the 3D space may need only be calculated as needed by another application. The 3D space may then be provided 1030 for virtual viewpoint operations as described above.

In addition, any one or more of the operations of FIGS. 5 and 6A-6B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
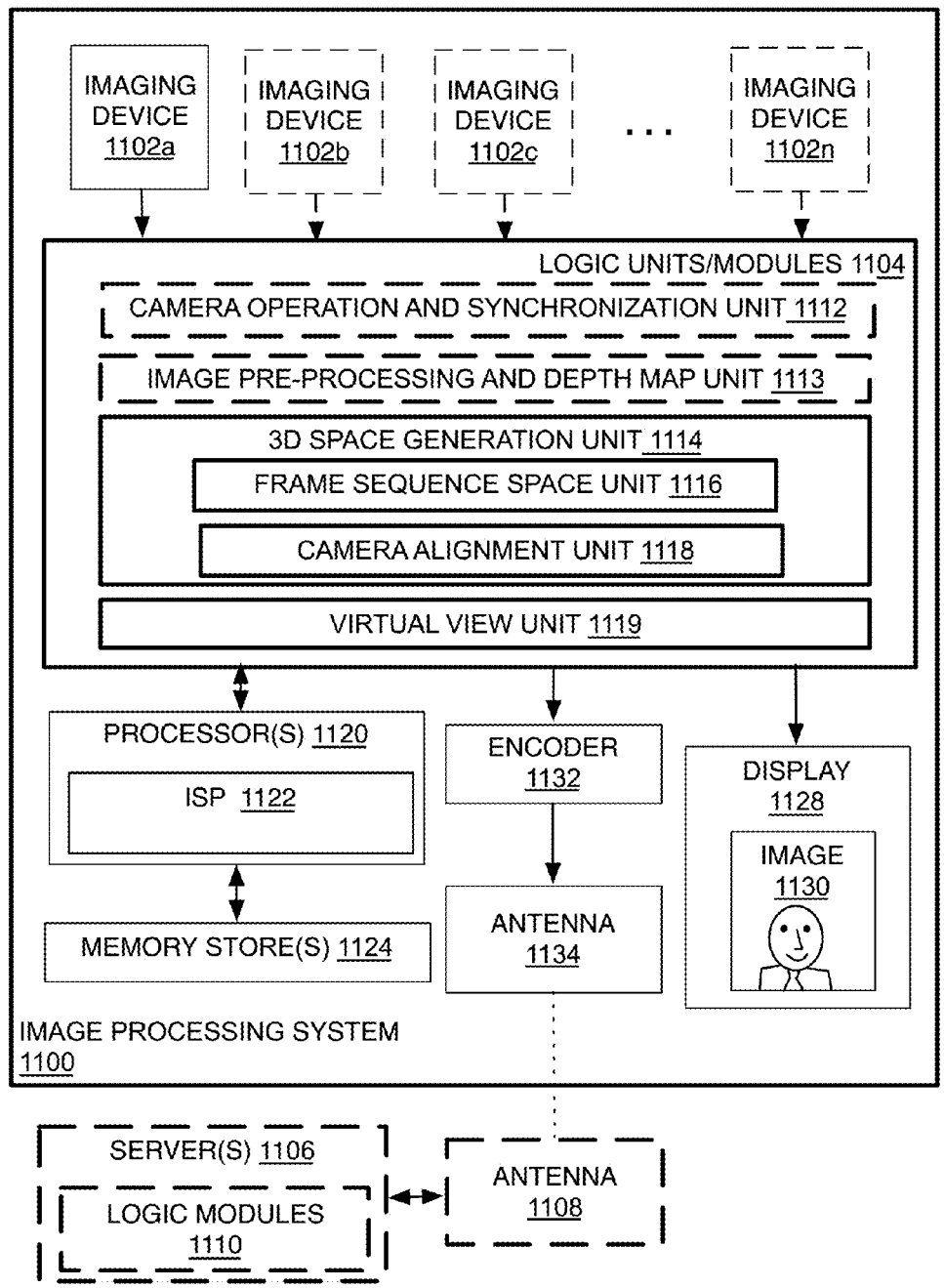
FIG. 11 is an illustrative diagram of an example system.

Referring to FIG. 11, an example image processing system 1100 is arranged in accordance with at least some implementations of the present disclosure. In various implementations, the example image processing system 1100 may have, or be in communication with, one or more imaging devices 1102a to 1102n to form or receive captured image data from a camera array formed by the imaging devices. This can be implemented in various ways. Thus, in one form, the image processing system 1100 may be one or more digital cameras or other image capture devices, and imaging devices 1102a to 1102n, in this case, may be, or include, the camera hardware and camera sensor software, module, or component 1104. In other examples, imaging processing system 1100 may have one or more imaging devices 1102a to 1102n that includes or may be one or more cameras, and logic modules 1104 may communicate remotely with, or otherwise may be communicatively coupled to, the imaging devices 1102a to 1102n for further processing of the image data.

Thus, image processing device 1100 may be a single main camera of a multi-camera array where the device may be a smartphone, tablet, laptop, or other consumer mobile device or a professional image capturing device either of which that may perform 3D space generation calculations. Otherwise, device 1100 may be the tablet, computer, or other processing device, whether or not a mobile device, that communicates with multiple cameras and performs the processing at a separate processing location communicating with the cameras.

In any of these cases, such technology may include a camera such as a digital camera system, a dedicated camera device, or an imaging phone or tablet, whether a still picture or video camera, camera that provides a preview screen, or some combination of these. Thus, in one form, imaging device 1102a to 1102n may include camera hardware and optics including one or more sensors as well as auto-focus, zoom, aperture, ND-filter, auto-exposure, flash, and actuator controls. Such sensor component can be used to generate images for a viewfinder and take still pictures or video. The imaging devices 1102a to 1102n also may have a lens, an image sensor with a RGB Bayer color filter, an analog amplifier, an A/D converter, other components to convert incident light into a digital signal, the like, and/or combinations thereof. The digital signal also may be referred to as the raw image data herein.

By one form, the cameras may be red-green-blue (RGB) depth cameras. Other forms include a camera sensor-type imaging device or the like (for example, a webcam or webcam sensor or other complementary metal-oxide-semi-conductor-type image sensor (CMOS)), with or without the use of a microphone-array to locate who is speaking. In other examples, an RGB-Depth camera and/or microphone-array might be used in addition to or in the alternative to a camera sensor. In some examples, imaging devices 1102a to 1102n may be provided with an eye tracking camera.

The imaging device 1100 may be hand-held or worn on the body, such as the devices mentioned above, or may be mounted on, or include, a robot, vehicle, or other moving device that moves on land, surfaces, air, water, and/or space. Many such devices that carry a camera are known such as drones. Other camera carrying devices may include structures that have fixed stands but either permit the camera to change location or permit the camera to rotate, tilt, and so forth at a fixed location. Many examples are contemplated.

By one form, all of the logic modules 1104 are operated by the image processing system 1100 that is a mobile device, such as one of the cameras labeled a main camera. By other examples, at least some, if not all, of the units of a logic module 1110, having the same units as logic module 1104, are operated by a remote server 1106. In this case, the server may have an antenna as described for other systems described herein for wireless communication with the imaging devices 1102a to 1102n. By one form, the imaging device(s) and main image processing system may perform the online operations while the server 1106 performs the offline operations. By other examples, the image processing system 1100 is a main device or camera that performs the offline operations. Many other examples exist.

In the illustrated example, the logic modules 1104 (or 1110) may include a camera operation and synchronization unit 1112 to operate the cameras including the time synchronization of frame capture, control of the motion of dynamic cameras, and so forth as described above. The logic modules 1104 (1110) also may include an image pre-processing and depth map unit 1113 to generate the depth maps that may be used for 3D space generation based on the image data from dynamic cameras. A 3D space generation unit 1114 also is provided by the logic modules 1104 (1110) and has a frame sequence unit 1116 to register frames along the same video sequences from individual cameras, and a camera alignment unit 1118 which aligns the image data of video sequences from different cameras. A virtual view unit 1119 is provided so that virtual views can be interpolated from the completed 3D space. The operation of these units is described above. Any combination of the units of the logic modules 1104 may be operated by, or even entirely or partially located at, processor(s) 1120, and which may include an ISP 1122. The logic modules 1104 may be communicatively coupled to the components of the imaging devices 1102a to 1102n in order to receive raw image data that includes sufficient data to establish the depth maps. In these cases, it is assumed the logic modules 1104 are considered to be separate from the imaging device. This need not be so, and the logic modules very well may be considered to be part of the imaging device as well.

The image processing system 1100 may have one or more processors 1120 which may include a dedicated image signal processor (ISP) 1122 such as the Intel Atom, memory stores 1124 which may or may not hold depth maps, frame timestamps, and other image data mentioned herein, one or more displays 1128 to provide images 1130, encoder 1132, and antenna 1134. In one example implementation, the image processing system 1100 may have the display 1128, at least one processor 1120 communicatively coupled to the display, and at least one memory 1124 communicatively coupled to the processor. The encoder 1132 and antenna 1134 may be provided to compress the modified image date for transmission to other devices that may display or store the image. It will be understood that the image processing system 1100 also may include a decoder (or encoder 1132 may include a decoder) to receive and decode image data for processing by the system 1100. Otherwise, processed images 1130 may be displayed on display 1128 or stored in memory 1124. As illustrated, any of these components may be capable of communication with one another and/or communication with portions of logic modules 1104 and/or imaging device 1102. Thus, processors 1120 may be communicatively coupled to both the image device 1102 and the logic modules 1104 for operating those components. By one approach, although image processing system 1100, as shown in FIG. 11, may include one particular set of blocks or actions associated with particular components or modules, these blocks or actions may be associated with different components or modules than the particular component or module illustrated here.

Figure 12:
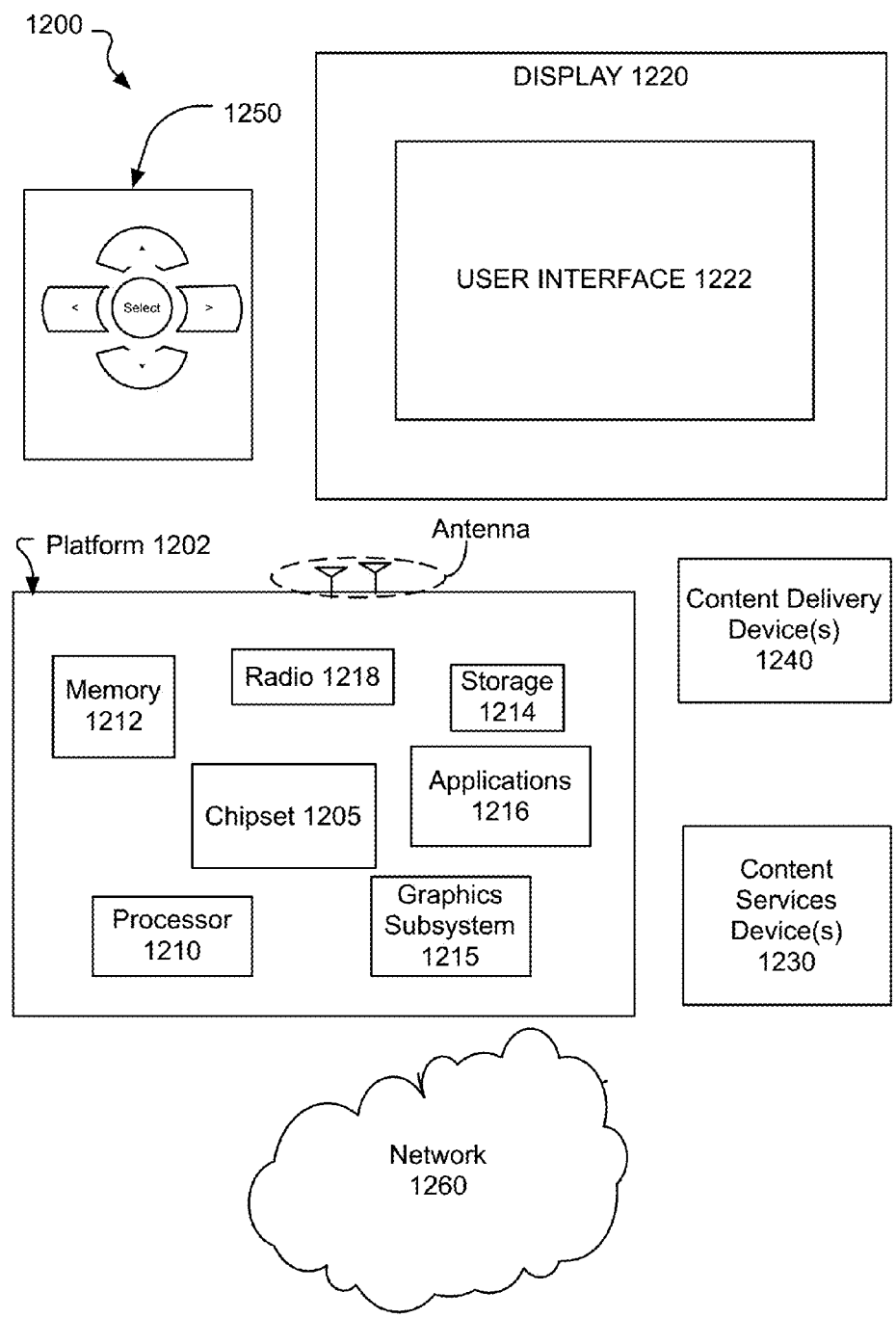
FIG. 12 is an illustrative diagram of another example system.

Referring to FIG. 12, an example system 1200 in accordance with the present disclosure operates one or more aspects of the image processing system described herein. It will be understood from the nature of the system components described below that such components may be associated with, or used to operate, certain part or parts of the image processing system 1100 described above. In various implementations, system 1200 may be a media system although system 1200 is not limited to this context. For example, system 1200 may be incorporated into a digital still camera, digital video camera, mobile device with camera or video functions such as an imaging phone, webcam, personal computer (PC), laptop computer, ultra-laptop computer, tablet with one or more multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In implementations, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In implementations, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implementations, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
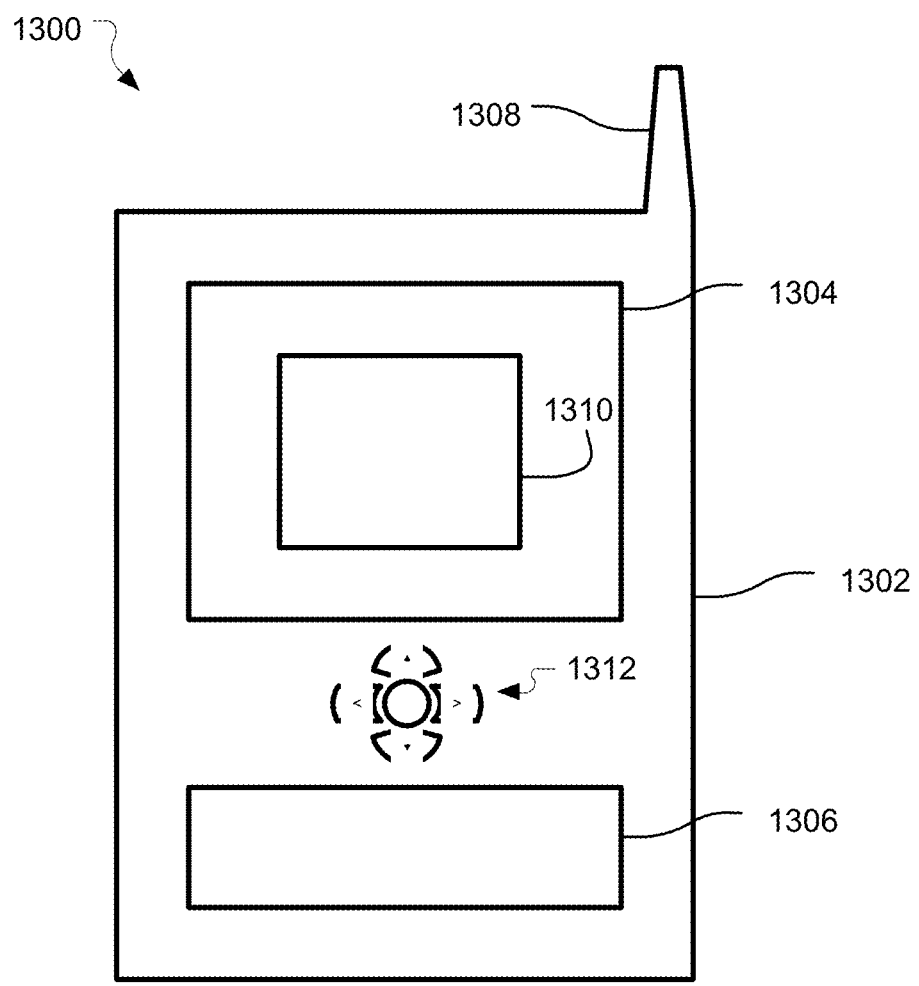
FIG. 13 illustrates another example device, all arranged in accordance with at least some implementations of the present disclosure.

Referring to FIG. 13, a small form factor device 1300 is one example of the varying physical styles or form factors in which system 1100 and/or 1200 may be embodied. By this approach, device 1300 may be implemented as a mobile computing device having wireless capabilities and may have, or be, one or more cameras in a camera array used for 3D space generation. A mobile computing device may refer to any device having a processing system and a mobile power source or supply, such as one or more batteries, for example.

As described above, examples of a mobile computing device that may be used as one of the cameras of the camera array or as a main processing unit for 3D space generation may include a digital still camera, digital video camera, mobile devices with camera or video functions such as imaging phones with or without multiple cameras on a single device, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers.

In some example, a mobile computing device with a camera may include, have, or be a robot, vehicle, or other moving device that moves on land, surfaces, air, water, and/or space. Many such devices that carry a camera are known such as drones. Other camera carrying devices may include structures that have fixed stands but either permit the camera to change location or permit the camera to rotate, tilt, and so forth at a fixed location. Many examples are contemplated.

In various implementations, for example, a mobile computing device may be implemented as a smart phone capable of executing computer applications, as well as voice communications and/or data communications. Although some implementations may be described with a mobile computing device implemented as a smart phone or a camera mounted on a drone by way of example, it may be appreciated that other implementations may be implemented using other wireless mobile computing devices as well. The implementations are not limited in this context.

As shown in FIG. 13, device 1300 may include a housing 1302, a display 1304 including a screen 1310, an input/output (I/O) device 1306, and an antenna 1308. Device 1300 also may include navigation features 1312. Display 1304 may include any suitable display unit for displaying information appropriate for a mobile computing device. I/O device 1306 may include any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method comprises obtaining image data including depth data of sequences of frames of at least one scene, wherein individual sequences are captured from individual cameras of a plurality of cameras; and determining the location of the image data of the sequences of frames on a shared three-dimensional coordinate system of the plurality of the cameras by using the image data of multiple frames to determine the location of the image data on the coordinate system. The location of the image data on the shared coordinate system is determined without determining values of the positions of the cameras before the capture of the sequences of frames in order to use the values of the positions in computations to determine the location of the image data on the shared coordinate system.

By another implementation, the method may comprise moving the cameras to positions to capture the image data wherein the positions are not planned before the capture of the image data, wherein the position comprises a coordinate location of the camera, an orientation of the optical axis of the camera, or both, wherein the shared coordinate system is determined by using iterative closest point algorithms; using overlapping frames with overlapping fields of view to determine the shared coordinate system based at least in part on the overlapping frames; locating image data of at least one frame relative to image data of at least one other frame along the same sequence of frames from an individual camera, and performing the locating by using an iterative closest point algorithm; locating image data of at least one frame from one camera of the plurality of cameras relative to the image data of at least one other frame from at least one other camera of the plurality of cameras, and performing the locating by using an iterative closest point algorithm, wherein the at least one frame and another frame have images captured at substantially the same time. The method also may comprise calculating image data locations on a frame in the same sequence of frames of an individual camera to determine coordinate axes for the sequence of frames; finding aligned frames of at least two different sequences depending on whether the difference in the location of points in an image of a frame on one sequence to the points in an image of a frame of another sequence at the same time as the frame of the one sequence meet a criteria; converting the coordinate axes of frames in one of the sequences of the aligned frames to the other sequence of the aligned frames; and using an iterative closest point transformation matrix to change coordinate axes from one sequence to the coordinate axes of another sequence of frames.

By other approaches, the operations provided by the method may similarly be provided by a system, and particularly, a computer-implemented system that has at least one memory to receive image data from a plurality of cameras, at least one processor communicatively coupled to the at least one memory, and a 3D space generation unit operated by the at least one processor and to obtain image data including depth data of sequences of frames of at least one scene, wherein individual sequences are captured from individual cameras of the plurality of cameras; and determine the location of the image data of the sequences of frames on a shared three-dimensional coordinate system of the plurality of the cameras by using the image data of multiple frames to determine the location of the image data on the coordinate system, wherein the location of the image data on the shared coordinate system is determined without determining values of the positions of the cameras before the capture of the sequences of frames in order to use the values of the positions in computations to determine the location of the image data on the shared coordinate system.

By yet other approaches, the system may include that the 3D space generation unit is to select one camera of the plurality of cameras as a master camera, wherein the axes of the master camera is used as the axes of the shared coordinate system; wherein the 3D space generation unit is to move the cameras to positions to capture the image data wherein the positions are not planned before the capture of the image data, wherein the position comprises a coordinate location of the camera, an orientation of the optical axis of the camera, or both; and wherein the shared coordinate system is determined by using iterative closest point algorithms. The 3D space generation unit also is to use overlapping frames with overlapping fields of view to determine the shared coordinate system based at least in part on the overlapping frames; wherein the 3D space generation unit is to locate image data of at least one frame relative to image data of at least one other frame along the same sequence of frames from an individual camera, and wherein the 3D space generation unit is to perform the locating by using an iterative closest point algorithm; and wherein the 3D space generation unit is to locate image data of at least one frame from one camera of the plurality of cameras relative to the image data of at least one other frame from at least one other camera of the plurality of cameras.

By another approach, the features provided by the method and/or system may be provided by at least one computer readable medium having stored thereon instructions that when executed cause a computing device to obtain image data including depth data of sequences of frames of at least one scene, wherein individual sequences are captured from individual cameras of a plurality of cameras; and determine the location of the image data of the sequences of frames on a shared three-dimensional coordinate system of the plurality of the cameras by using the image data of multiple frames to determine the location of the image data on the coordinate system, wherein the location of the image data on the shared coordinate system is determined without determining values of the positions of the cameras before the capture of the sequences of frames in order to use the values of the positions in computations to determine the location of the image data on the shared coordinate system.

By a further approach, the instructions may cause the computing device to move the cameras to positions to capture the image data wherein the positions are not planned before the capture of the image data, wherein the position comprises a coordinate location of the camera, an orientation of the optical axis of the camera, or both, wherein the shared coordinate system is determined by using iterative closest point algorithms; use overlapping frames with overlapping fields of view to determine the shared coordinate system based at least in part on the overlapping frames; locate image data of at least one frame relative to image data of at least one other frame along the same sequence of frames from an individual camera, and perform the locating by using an iterative closest point algorithm; locate image data of at least one frame from one camera of the plurality of cameras relative to the image data of at least one other frame from at least one other camera of the plurality of cameras, and perform the locating by using an iterative closest point algorithm. The instructions also may include that at least one frame and another frame have images captured at substantially the same time; calculate image data locations on a frame in the same sequence of frames of an individual camera to determine coordinate axes for the sequence of frames; find aligned frames of at least two different sequences depending on whether the difference in the location of points in an image of a frame on one sequence to the points in an image of a frame of another sequence at the same time as the frame of the one sequence meet a criteria; convert the coordinate axes of frames in one of the sequences of the aligned frames to the other sequence of the aligned frames; and use an iterative closest point transformation matrix to change coordinate axes from one sequence to the coordinate axes of another sequence of frames.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of 3D image capture comprising:
    obtaining image data including depth data of sequences of frames of at least one scene, wherein individual sequences are captured from individual cameras of a plurality of cameras; and
    determining the location of the image data of the sequences of frames on a shared three-dimensional coordinate system of the plurality of the cameras by using the image data of multiple frames to determine the location of the image data on the coordinate system,
    wherein the location of the image data on the shared coordinate system is determined without determining values of the positions of the cameras before the capture of the sequences of frames in order to use the values of the positions in computations to determine the location of the image data on the shared coordinate system.

2. The method of claim 1 comprising moving the cameras to positions to capture the image data wherein the positions are not planned before the capture of the image data, wherein the position comprises a coordinate location of the camera, an orientation of the optical axis of the camera, or both.

3. The method of claim 1 wherein the shared coordinate system is determined by using iterative closest point algorithms.

4. The method of claim 1 comprising using overlapping frames with overlapping fields of view to determine the shared coordinate system based at least in part on the overlapping frames.

5. The method of claim 4 comprising determining the location of at least one frame relative to a frame that overlaps the at least one frame and in the same sequence of frames as the at least one frame.

6. The method of claim 1 comprising locating image data of at least one frame relative to image data of at least one other frame along the same sequence of frames from an individual camera.

7. The method of claim 6 comprising performing the locating by using an iterative closest point algorithm.

8. The method of claim 1 comprising locating image data of at least one frame from one camera of the plurality of cameras relative to the image data of at least one other frame from at least one other camera of the plurality of cameras.

9. The method of claim 8 comprising performing the locating by using an iterative closest point algorithm.

10. The method of claim 8 wherein the at least one frame and another frame have images captured at substantially the same time.

11. The method of claim 1 comprising:
    calculating image data locations on a frame in the same sequence of frames of an individual camera to determine coordinate axes for the sequence of frames;
    finding aligned frames of at least two different sequences depending on whether the difference in the location of points in an image of a frame on one sequence to the points in an image of a frame of another sequence at the same time as the frame of the one sequence meet a criteria; and
    converting the coordinate axes of frames in one of the sequences of the aligned frames to the other sequence of the aligned frames.

12. The method of claim 11 comprising using an iterative closest point transformation matrix to change coordinate axes from one sequence to the coordinate axes of another sequence of frames.

13. The method of claim 1 comprising:
    moving the cameras to positions to capture the image data wherein the positions are not planned before the capture of the image data, wherein the position comprises a coordinate location of the camera, an orientation of the optical axis of the camera, or both, wherein the shared coordinate system is determined by using iterative closest point algorithms;
    using overlapping frames with overlapping fields of view to determine the shared coordinate system based at least in part on the overlapping frames;
    locating image data of at least one frame relative to image data of at least one other frame along the same sequence of frames from an individual camera, and performing the locating by using an iterative closest point algorithm;
    locating image data of at least one frame from one camera of the plurality of cameras relative to the image data of at least one other frame from at least one other camera of the plurality of cameras, and performing the locating by using an iterative closest point algorithm, wherein the at least one frame and another frame have images captured at substantially the same time;
    calculating image data locations on a frame in the same sequence of frames of an individual camera to determine coordinate axes for the sequence of frames;

finding aligned frames of at least two different sequences depending on whether the difference in the location of points in an image of a frame on one sequence to the points in an image of a frame of another sequence at the same time as the frame of the one sequence meet a criteria;

converting the coordinate axes of frames in one of the sequences of the aligned frames to the other sequence of the aligned frames; and using an iterative closest point transformation matrix to change coordinate axes from one sequence to the coordinate axes of another sequence of frames.

14. A computer-implemented system comprising:
at least one memory to receive image data from a plurality of cameras;
at least one processor communicatively coupled to the at least one of the memory; and
a 3D space generation unit operated by the at least one processor and to:
obtain image data including depth data of sequences of frames of at least one scene, wherein individual sequences are captured from individual cameras of the plurality of cameras; and
determine the location of the image data of the sequences of frames on a shared three-dimensional coordinate system of the plurality of the cameras by using the image data of multiple frames to determine the location of the image data on the coordinate system,
wherein the location of the image data on the shared coordinate system is determined without determining values of the positions of the cameras before the capture of the sequences of frames in order to use the values of the positions in computations to determine the location of the image data on the shared coordinate system.

15. The system of claim 14 wherein the 3D space generation unit is to select one camera of the plurality of cameras as a master camera, wherein the axes of the master camera is used as the axes of the shared coordinate system.

16. The system of claim 14 wherein the 3D space generation unit is to move the cameras to positions to capture the image data wherein the positions are not planned before the capture of the image data, wherein the position comprises a coordinate location of the camera, an orientation of the optical axis of the camera, or both.

17. The system of claim 14 wherein the shared coordinate system is determined by using iterative closest point algorithms.

18. The system of claim 14 wherein the 3D space generation unit is to use overlapping frames with overlapping fields of view to determine the shared coordinate system based at least in part on the overlapping frames.

19. The system of claim 18 wherein the 3D space generation unit is to determine the location of at least one frame relative to a frame that overlaps the at least one frame and in the same sequence of frames as the at least one frame.

20. The system of claim 14 wherein the 3D space generation unit is to locate image data of at least one frame relative to image data of at least one other frame along the same sequence of frames from an individual camera.

21. The system of claim 20 wherein the 3D space generation unit is to perform the locating by using an iterative closest point algorithm.

22. The system of claim 14 wherein the 3D space generation unit is to locate image data of at least one frame from one camera of the plurality of cameras relative to the image data of at least one other frame from at least one other camera of the plurality of cameras.

23. The system of claim 14 wherein the 3D space generation unit is to select one camera of the plurality of cameras as a master camera, wherein the axes of the master camera is used as the axes of the shared coordinate system;
wherein the 3D space generation unit is to move the cameras to positions to capture the image data wherein the positions are not planned before the capture of the image data, wherein the position comprises a coordinate location of the camera, an orientation of the optical axis of the camera, or both;
wherein the shared coordinate system is determined by using iterative closest point algorithms;
wherein the 3D space generation unit is to use overlapping frames with overlapping fields of view to determine the shared coordinate system based at least in part on the overlapping frames;
wherein the 3D space generation unit is to locate image data of at least one frame relative to image data of at least one other frame along the same sequence of frames from an individual camera, and wherein the 3D space generation unit is to perform the locating by using an iterative closest point algorithm; and
wherein the 3D space generation unit is to locate image data of at least one frame from one camera of the plurality of cameras relative to the image data of at least one other frame from at least one other camera of the plurality of cameras.

24. A computer-readable medium having stored thereon instructions that when executed cause a computing device to:
obtain image data including depth data of sequences of frames of at least one scene, wherein individual sequences are captured from individual cameras of a plurality of cameras; and
determine the location of the image data of the sequences of frames on a shared three-dimensional coordinate system of the plurality of the cameras by using the image data of multiple frames to determine the location of the image data on the coordinate system,
wherein the location of the image data on the shared coordinate system is determined without determining values of the positions of the cameras before the capture of the sequences of frames in order to use the values of the positions in computations to determine the location of the image data on the shared coordinate system.

25. The computer-readable medium of claim 24 wherein the computing device is to:
move the cameras to positions to capture the image data wherein the positions are not planned before the capture of the image data, wherein the position comprises a coordinate location of the camera, an orientation of the optical axis of the camera, or both, wherein the shared coordinate system is determined by using iterative closest point algorithms;
use overlapping frames with overlapping fields of view to determine the shared coordinate system based at least in part on the overlapping frames;
locate image data of at least one frame relative to image data of at least one other frame along the same sequence of frames from an individual camera, and perform the locating by using an iterative closest point algorithm;
locate image data of at least one frame from one camera of the plurality of cameras relative to the image data of at least one other frame from at least one other camera of the plurality of cameras, and perform the locating by using an iterative closest point algorithm, wherein the at least one frame and another frame have images captured at substantially the same time;

calculate image data locations on a frame in the same sequence of frames of an individual camera to determine coordinate axes for the sequence of frames;

find aligned frames of at least two different sequences depending on whether the difference in the location of points in an image of a frame on one sequence to the points in an image of a frame of another sequence at the same time as the frame of the one sequence meet a criteria;

convert the coordinate axes of frames in one of the sequences of the aligned frames to the other sequence of the aligned frames; and use an iterative closest point transformation matrix to change coordinate axes from one sequence to the coordinate axes of another sequence of frames.

* * * * *